(12) United States Patent
Garnett et al.

(10) Patent No.: US 7,654,154 B2
(45) Date of Patent: Feb. 2, 2010

(54) CONDITIONING ORIFICE PLATE WITH PIPE WALL PASSAGES

(75) Inventors: John Everett Garnett, Boulder, CO (US); Stephen Arthur Ifft, Longmont, CO (US)

(73) Assignee: Dieterich Standard, Inc., Boulder, CO (US)

( * ) Notice: Subject to any disclaimer, the term of this patent is extended or adjusted under 35 U.S.C. 154(b) by 18 days.

(21) Appl. No.: 12/053,396

(22) Filed: Mar. 21, 2008

(65) Prior Publication Data

US 2009/0235757 A1    Sep. 24, 2009

(51) Int. Cl.
*G01F 1/37* (2006.01)
*G01F 1/42* (2006.01)
(52) U.S. Cl. .................................. 73/861.52; 73/861.61
(58) Field of Classification Search .............. 73/861.52, 73/861.61
See application file for complete search history.

(56) References Cited

U.S. PATENT DOCUMENTS

| | | | | |
|---|---|---|---|---|
| 2,451,425 | A * | 10/1948 | Allwein ................... | 73/861.61 |
| 4,926,698 | A * | 5/1990 | Owen ....................... | 73/861.61 |
| 6,073,483 | A * | 6/2000 | Nitecki et al. ............ | 73/861.52 |
| 6,164,142 | A * | 12/2000 | Dimeff .................... | 73/861.61 |
| 6,601,460 | B1* | 8/2003 | Materna .................. | 73/861.52 |
| 6,655,207 | B1* | 12/2003 | Speldrich et al. ......... | 73/861.61 |
| 6,672,173 | B2* | 1/2004 | Bell ........................ | 73/861.52 |
| 7,284,450 | B2* | 10/2007 | Orleskie et al. .......... | 73/861.52 |

* cited by examiner

*Primary Examiner*—Harshad Patel
(74) *Attorney, Agent, or Firm*—Richard W. Hanes; Hanes & Schutz, LLC

(57) ABSTRACT

An element of an averaging orifice plate fluid flow meter for measuring the volumetric rate of fluid flow in a conduit having an interior circumference for carrying a flow of fluid comprising, a planar flow impedance plate for disposition transversely across the interior of the conduit and perpendicular to the fluid flow, a plurality of spaced apart orifices disposed in the plate where the profile of each orifice is a segment of a circle on an arc where the arc is coincident with a portion of the interior circumference of the conduit.

9 Claims, 5 Drawing Sheets

CONDITIONING ORIFICE PLATE WITH PIPE WALL PASSAGES

FIELD OF THE INVENTION

The present invention relates to an orifice plate type of process fluid flow meter having a plurality of openings that average the differential fluid pressures across the plate in asymmetric profile flow.

BACKGROUND OF THE INVENTION

In process piping the need for flow conditioners downstream of pipe elbows, valves and other flow interrupting devices is well documented in many prior art patents. Using an orifice plate flow meter with multiple apertures to self-condition disturbed and non-linear flow by averaging the differential pressure drops across a plate is the subject of U.S. Pat. No. 7,284,450. In the '450 patent the background of the problem solved by the averaging orifice plate is set forth and is incorporated herein by reference.

Following some period of use of the averaging orifice plate flow element disclosed in the '450 patent it has been discovered that some beta ratio designs of the flow element create a blockage along the walls of the fluid carrying conduit. Such blockage diverts abrasive particulates that would otherwise travel along the pipe wall into the interior of the fluid stream, causing the particles to erode the sharp upstream edges of the orifices and thus depreciate the accuracy of the flow rate measurement. The upstream edges are especially susceptible to erosion because they are not only sharp but they are also thin, the downstream side of the edge being beveled to allow expansion of the fluid after it passes through the orifice.

Accordingly, it is the primary object of the present invention to prevent fluid blockage by positioning the openings in the orifice plate proximate the pipe wall.

Another object of the invention is to position the openings of an averaging orifice plate so that particulates, as well as liquids in gas applications, can pass freely through the flow meter with minimal impact on the sharp edges of the plate's orifices, whether the fluid flow in the pipe is annular or stratified.

A still further object of the invention is to substantially reduce the extent of orifice edges in an averaging orifice plate flow meter that are subject to erosion.

Other and still further objects, features and advantages of the present invention will be apparent upon a reading of the following detailed description of the invention, taken in conjunction with the drawings.

SUMMARY OF THE INVENTION

The present invention relates to an orifice plate type of differential pressure fluid flow meter. The static pressure ports that are a necessary part of the flow meter are traditional in their upstream and downstream positioning and structure.

The preferred form of the invention is implemented by a flat orifice plate sandwiched between pipe connecting flanges. In a secondary embodiment the orifice plate is carried by an annulus that is insertable between sections of the fluid carrying conduit where the central opening of the mounting annulus corresponds in shape and size to the interior cross section of the circular conduit carrying the fluid whose flow rate is to be measured. The planar flow impedance plate is disposed within the central opening of the annulus coincident with a plane that is perpendicular to the longitudinal axis of the central opening. Instead of having a set of circular orifices such as the ones disclosed in the '450 patent, the impedance plate of both embodiments of the present invention is provided with a plurality of spaced apart openings or notches disposed in the circumference of the plate. Preferably, the circumferential openings are shaped as segments of a circle on an arc where the arc of each circle is coincident with an arc of the interior circumference of the mounting annulus. An impedance plate having four equal-spaced orifices, shaped as described above, has the resultant shape of a cruciform.

DETAILED DESCRIPTION

Figure 1:
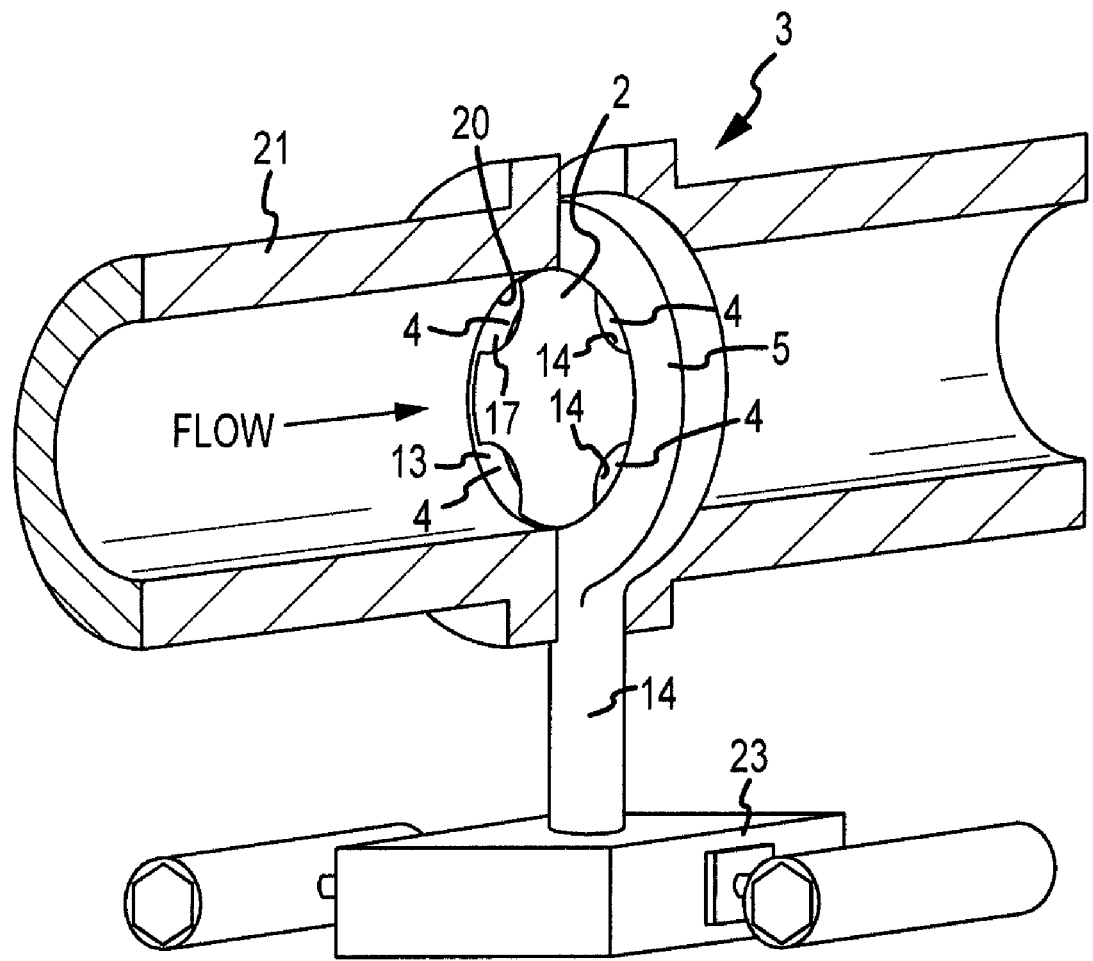
FIG. 1 is a perspective fragmentary cross sectional view of a primary flow element in the alternative form of the present invention, where the planar flow impedance plate is carried by a mounting annulus.

The successful operation of traditional orifice plate flow meters is based on Bernoulli's theorem. Bernoulli states that along any one streamline in a moving fluid, the total energy per unit mass is constant, being made up of the potential energy, the pressure energy and the kinetic energy of the fluid. Thus, when fluid passes through an orifice in a constricting pipe plate, the velocity of the fluid through the orifice increases. This increase in fluid velocity causes the dynamic pressure of the fluid immediately downstream of the orifice plate to increase, while simultaneously decreasing the static pressure of the fluid at that same point. By sensing the static pressure on the upstream and downstream sides of the orifice plate, the decrease of static pressure on the downstream side results in a measurement of the pressure differential, dP, between the upstream side of the orifice plate and the downstream side. The rate of fluid flow q is proportional to $\sqrt{dP}$.

Traditional prior art orifice plate flow meters work well when the velocity profile of the fluid is parabolic. That is, the fluid's velocity profile is symmetrical about the longitudinal axis of the pipe in which the fluid is flowing. In such a case, the highest velocity fluid is along the central axis of the pipe, coaxial with the centrally located orifice in the constricting pipe plate. When traveling through the orifice of a traditional orifice plate, the highest velocity fluid is the fluid that produces the pressure differential across the plate to provide the flow rate result.

However, if the velocity profile is skewed a lower velocity fluid will pass through the central orifice and the downstream static pressure will be a reflection of that lower velocity fluid. The differential pressure thus produced across the constricting plate will not be a true indication of the rate of fluid flow.

The present invention is adaptable to two different mounting configurations but in both of these configurations the function and operation of the peripheral notch orifices are the same. The plurality of orifices average the pressure drops across the plate at spaced apart locations in the velocity profile, but their positions next to the pipe wall prevent fluid blockage and provide the other objectives of the invention.

According to one form of the present invention the flow impedance plate 2 of the primary flow element 3 is integrally incorporated into the central opening of an annular mounting ring 5. Disposed within the ring 5 are upstream and downstream static pressure measuring ports 6 and 8. These ports communicate with a valving manifold 23, pressure transducers and a signal transmitter that are located exteriorly of the fluid carrying pipe through respective bores 10 and 12 located in a stem 14 projecting from the outside surface of the ring 5.

Figure 4:
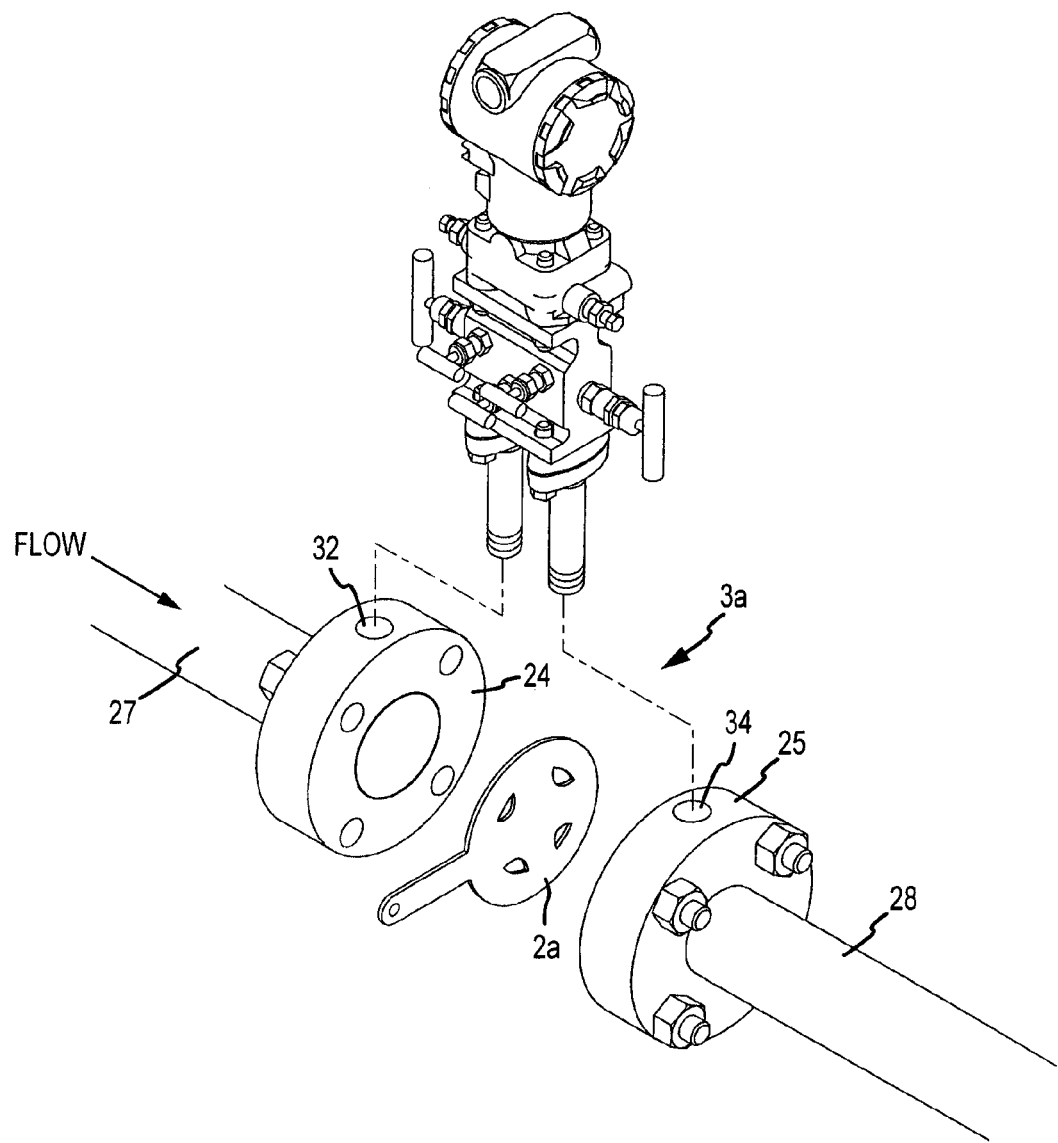
FIG. 4 is an exploded perspective view of the preferred form of orifice plate of the present invention where the plate is mounted by being sandwiched between two adjacent pipe connecting flanges fixed to the ends of a fluid carrying conduit.
Figure 5:
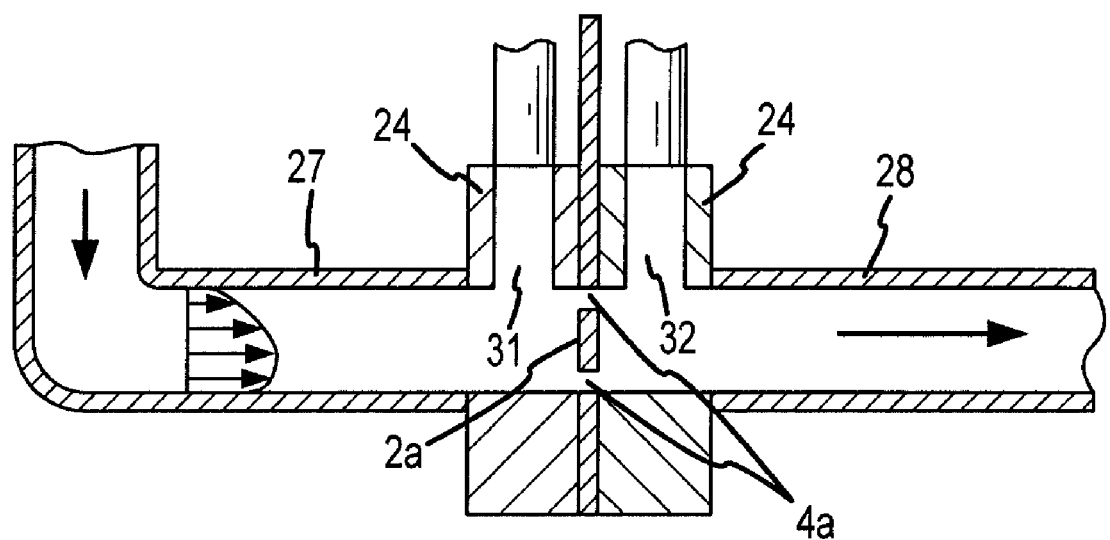
FIG. 5 is a diagrammatic cross sectional view of the preferred form of mounting the impedance plate, as shown in FIG. 4, illustrating the asymmetric fluid profile resulting from the pipe elbow upstream of the orifice plate flow measurement device of the present invention.

Regardless of the mounting method, the impedance plates 2 and 2a include a plurality of circumferentially positioned orifices 4 and 4a. Each of the plurality of circumferentially positioned orifices conducts a portion of the total fluid flow within the conduits 21, 27 and 28. According to Bernoulli's theorem, the velocity of the fluid through each of the orifices will increase while the static fluid pressure on the downstream side of each orifice in the constricting plates 2 and 2a decreases. The static pressures attributable to the separate orifices will be averaged within the fluid to provide an average downstream static pressure at a downstream pressure port, such as the port 8 in the alternative form or the port 32 in flange 24 of the FIG. 4 embodiment. The average downstream static pressure is compared with the upstream static pressure taken at an upstream pressure port, such as the port 6 in the annulus 5 or the port 34 in flange 25, to provide an average differential pressure for whatever velocity profile may be presented to the multiple orifice plates 2 and 2a, resulting in an accurate measurement of the rate of fluid flow in the pipe regardless of the asymmetry of the velocity profile.

Figure 2:
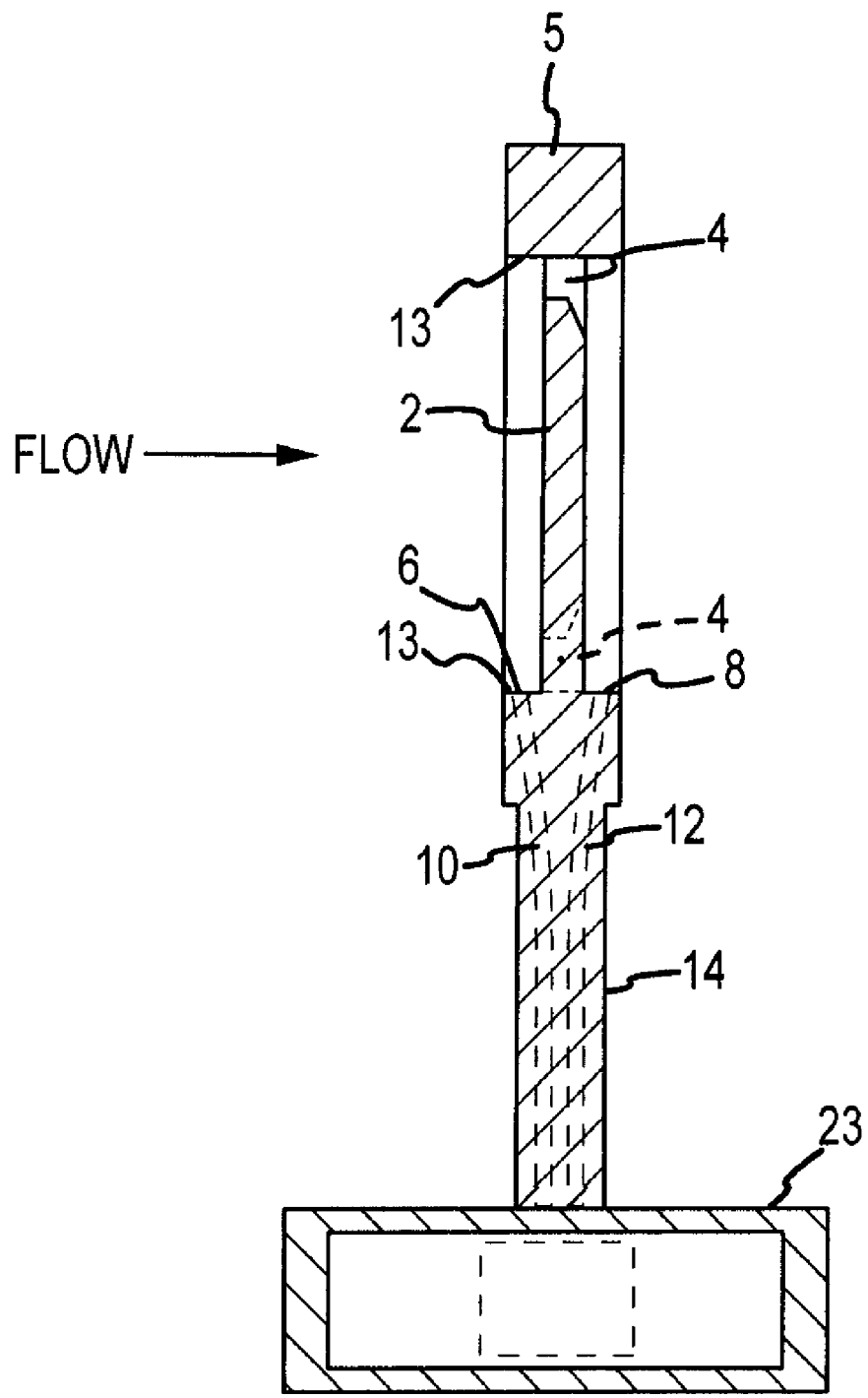
FIG. 2 is a cross sectional side view of the orifice plate and mounting annulus shown in FIG. 1.
Figure 3:
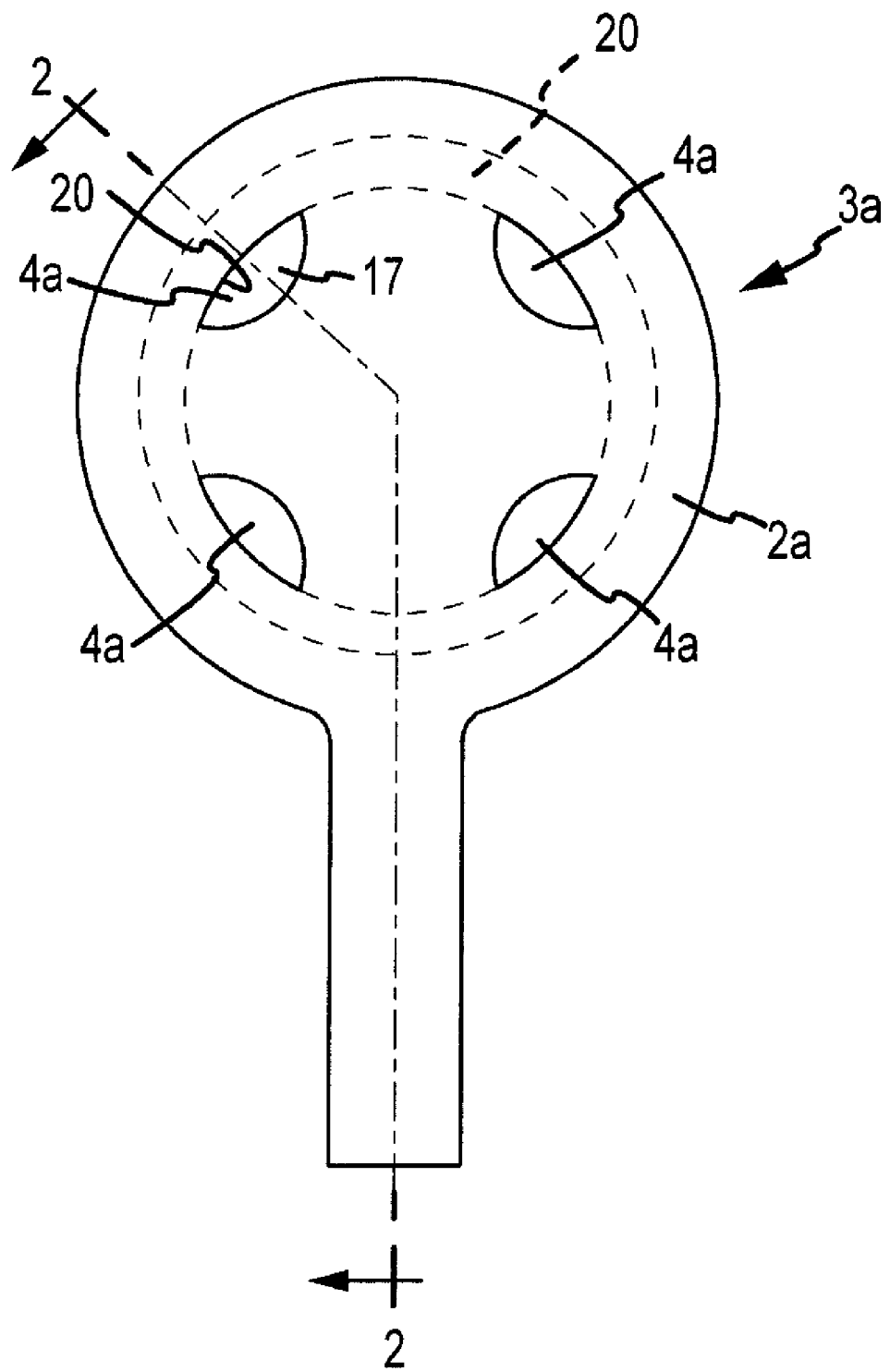
FIG. 3 is a front view of the preferred form of the planar flow impedance plate of the present invention.

As set forth above, the object of the invention is to position the orifices 4 and 4a in the averaging orifice plates 2 and 2a so that the orifices are adjacent to the inside surface of the conduit 21 (for the embodiment of FIGS. 3 and 4) and adjacent to the annulus 5 in the embodiment of FIGS. 1 and 2 so that particulates, as well as liquids in gas applications, can pass freely through the orifices in the flow meter with minimal impact on the sharp edges of the plate's orifices, whether the fluid flow in the pipe is annular or stratified.

Annular wet gas flow occurs where the rate of gas flow is high and any liquid in the gas is forced into an annularly shaped ring that coats the pipe walls with liquid. Annular flow can occur in horizontally and vertically positioned pipes. On the other hand, stratified wet gas flow occurs where the rate of gas flow is relatively low, allowing the liquid in the gas to flow along the bottom portion of a horizontal pipe. Positioning of the plate orifices adjacent the pipe wall and where the lower most orifice is adjacent the bottom portion of the pipe accomplishes the objectives of the invention.

When so positioned the orifices can no longer be circular but must be elongated in order to place the open areas of the flow impedance plate proximate the inside surface of either the conduit 21 or the annulus 5, the inside of the annulus being equivalent to the inside surface of the wall of conduit 21. To accomplish this objective the outside periphery of each orifice in the embodiment of FIGS. 1 and 2 is formed by the inside circumferential surface 13 of the annular mounting ring 5, which inside surface 13 is congruent with the inside surface of the fluid carrying pipe.

The preferred embodiment 3a of the primary flow element of the present invention comprises an enlarged diameter impedance plate 2a that is mounted between connecting flanges 24 and 25 of two sections 27 and 28 of the fluid carrying pipe. The openings 4a in the plate are cut in the shape of the circle segment 17 with the outside arcs 20 all lying on a circular curve that is congruent with the inside periphery of the pipes 27 and 28. The plate's enlarged diameter allows it to be sandwiched between the flanges 24 and 25 for mounting. The upstream and downstream pressure ports 31 and 32 are contained in the flanges 24 and 25.

The congruity of the outside of the orifices and the inside surface of the fluid carry conduit serves two important and unobvious functions. First, it allows the fluid and entrained particulates in the pipe to flow through the orifice forming peripheral notches 4 without blockage. Second, since the outer peripheral portion of each notch orifice is formed by the inside of the pipe wall or, in the alternative form, the inside perimeter 13 of the annular ring 15, the cumulative length of the edges 14 comprising the plurality of orifices is substantially reduced.

The preferred shape of the circumferential notches 4 and 4a in the flow impedance plates 2 and 2a can be described as a segment (area) 17 of a circle on an arc 20 through the circle, the arc being formed by the inside surface 13 of the annular ring 15 or the inside surface of the conduit 21.

What is claimed is:

1. An averaging orifice plate fluid flow meter for measuring the volumetric rate of fluid flow in a conduit, comprising,
    a conduit having an interior circumference for carrying fluid from an upstream location to a downstream location,
    a planar flow impedance plate for disposition transversely across the interior of the conduit and perpendicular to the fluid flow,
    a plurality of spaced apart orifices disposed in the plate where the profile of each orifice is a segment of a circle on an arc where the arc is coincident with a portion of the interior circumference of the conduit,
    a first static pressure sensing element disposed upstream of the planar flow impedance plate and proximate thereto,
    a second static pressure sensing element disposed downstream of the planar flow impedance plate and proximate thereto.

2. The flow meter of claim 1 where the profile of the planar flow impedance plate that is perpendicular to the fluid flow is cruciform in shape.

3. A primary flow element of an averaging differential pressure flow meter that is insertable between sections of a fluid carrying conduit comprising,
    an annulus having a central opening corresponding in shape and size to the inside cross section of the circular conduit,
    a circular planar flow impedance plate mounted congruently within the central opening of the annulus, said plate having a plurality of spaced apart openings adjacent its circumference, where the circumferential openings are shared as segments of a circle on an arc, where each said arc is coincident with an arc portion of the interior periphery of the annulus.

4. The flow meter element of claim 3 where the plate is cruciform in shape.

5. The flow meter element of claim 3 where the circle segments have beveled downstream edges.

6. An impedance element of an averaging orifice plate fluid flow meter for measuring the volumetric rate of fluid flow in a conduit where the element is insertable between sections of the conduit, comprising,
    a circularly shaped planar plate,
    a plurality of spaced apart circumferential openings in the plate, each of which opening comprises a segment of a circle on an arc where the arc is coincident with the arc of the inside surface of the conduit.

7. The impedance element of claim 6 and further including, a mounting annulus, the diameter of the interior opening of which is equal to the inside diameter of the conduit and where the plate is mounted within the said interior opening, the plane of the plate being perpendicular to the longitudinal axis of the annulus.

8. An impedance element of an averaging orifice plate fluid flow meter for measuring the volumetric rate of fluid flow in a conduit where the element is insertable between sections of the conduit, comprising, a circularly shaped planar plate, a plurality of spaced apart openings in the plate, each of which opening comprises a segment of a circle on an arc where the arc is coincident with an arc portion of the inside surface of the conduit.

9. The impedance element of claim 8 and further including a handle projecting radially from the circumference of the plate.

* * * * *